United States Patent [19]

Lin

[11] Patent Number: 4,531,196

[45] **Date of Patent: * Jul. 23, 1985**

[54] REAL-TIME FOURIER TRANSFORMER USING ONE ACOUSTO-OPTICAL CELL

[75] Inventor: Samuel S. Lin, Alexandria, Va.

[73] Assignee: The United States of America as represented by the Secretary of the Navy, Washington, D.C.

[ * ] Notice: The portion of the term of this patent subsequent to Jul. 23, 2002 has been disclaimed.

[21] Appl. No.: 488,930

[22] Filed: Apr. 27, 1983

[51] Int. Cl.[3] .......................... G06G 7/19; G02F 1/11

[52] U.S. Cl. .................................... 364/827; 364/822; 350/162.12; 350/320; 350/358

[58] Field of Search ......................... 364/807, 821–822, 364/826–827, 837; 350/162.12, 317, 320, 353, 358

[56] References Cited

U.S. PATENT DOCUMENTS

| | | | |
|---|---|---|---|
| 4,012,120 | 3/1977 | Kagiwada et al. | 364/821 X |
| 4,049,958 | 9/1977 | Hartmann | 364/821 X |
| 4,126,834 | 11/1978 | Coppock | 332/7.51 |
| 4,139,277 | 2/1979 | Berg et al. | 350/358 |
| 4,164,717 | 8/1979 | Blazey | 350/358 X |
| 4,225,938 | 9/1980 | Turpin | 364/822 |
| 4,326,778 | 4/1982 | Berg et al. | 350/358 |
| 4,339,176 | 7/1982 | Lee | 350/162.12 X |
| 4,426,134 | 1/1984 | Abramovitz et al. | 350/358 |
| 4,471,445 | 9/1984 | Pernick | 364/827 X |

OTHER PUBLICATIONS

J. N. Lee et al., "Discrete Fourier Transformation Using a Time-Integrating, Acousto-Optical signal Transformer", Applied Physics Letters, vol. 41, pp. 131–132, Jul. 15, 1982.

N. N. Lee et al., "New Acousto-Optical Devices for Fourier Transformation", SPIE Proceedings—vol. 341, Real Time Signal Processing V. pp. 86–93, 1982 Pub. Feb. 1983.

*Primary Examiner*—Jerry Smith
*Assistant Examiner*—Gary V. Harkcom
*Attorney, Agent, or Firm*—Robert F. Beers; William T. Ellis; Charles S. Guenzer

[57] ABSTRACT

An optical Fourier transformer comprising a laser which is modulated by the signal to be analyzed, a beam splitter for dividing the beam into two beams which are directed by optical means to opposite sides of a Bragg cell with the corresponding rays in the two beams striking opposite ends of the Bragg cell. A chirp signal impressed upon the Bragg cell causes each of the beams incident thereon to produce a diffracted beam. The diffracted beams are recombined by optical means with the corresponding rays becoming coincident and the recombined beams are directed to a time-integrating photo-detector array. The distribution of intensities on the array is related to the Fourier transform.

13 Claims, 7 Drawing Figures

REAL-TIME FOURIER TRANSFORMER USING ONE ACOUSTO-OPTICAL CELL

CROSS-REFERENCE TO RELATED APPLICATIONS

See Application Ser. No. 488,924 filed on Apr. 27, 1983, by the same inventor.

BACKGROUND

1. Field of the Invention

The field of the invention in general is an optical signal processor and in particular is an optical Fourier transformer utilizing one acousto-optical cell.

2. Description of the Prior Art

Fourier transforms are used in many fields of technology for converting information from one representation to another. Fourier transformations of time-domain signals are particularly important in signal processing such as in the fields of radar and sonar for which the one-dimensional transformation is given by $$S'(f) = S(t) \int_{-\infty}^{+\infty} \exp(-i2\pi ft)\, dt. \quad (1)$$

The function S(t) is the time-domain signal and S'(f) is the frequency-domain signal which is the Fourier transform of S(t). The conventions used to define Fourier transformations may be somewhat different from those of Eqn. (1) but they only introduce additional constants of proportionality.

For signal processing of arbitrary waveforms, the transformation of Eqn. (1) cannot be performed analytically. One available method to Fourier transform signals involves sampling the signal S(t), digitizing the samples, and then using a computer to numerically transform S(t) to S'(f). Elaborate but efficient computer codes have been written for this task under the generic name of fast Fourier transforms (FFTs). Alternatively electronic chips have been implemented which perform the parallel analog equivalent of the digital FFT.

These FFT methods, although fast, are not nearly fast enough for the requirements of evolving systems. Not only are they throughput or bandwidth limited, but they are not real-time Fourier transformers in the respect that the signal S(t) must, in general, be completed before the transformation procedure is initiated. Furthermore, the fastest electronic FFTs tend to be heavy or power-consuming.

SUMMARY OF THE INVENTION

Accordingly it is an object of this invention to provide a real-time Fourier transformer.

It is a further object of this invention to provide a compact, low-power Fourier transformer.

It is yet a further object of this invention to provide a Fourier transformer that is accurate and free of environmental perturbations.

The invention is an acousto-optical processor for performing Fourier transforms in which a temporally varying signal modulates the intensity of a coherent light source. The resulting beam is split into two beams which are directed onto opposing faces of an acousto-optical cell such as a Bragg cell with corresponding rays of the two beams hitting opposite ends of the Bragg cell upon which is impressed a linear FM or chirp signal. The acousto-optical cell diffracts both beams and the diffracted beams of the same order are recombined with the corresponding rays being coincident such that they interfere. Optical detectors integrate the light intensity at points across the combined beam. The spatial distribution of integrated intensity is related to the Fourier transform of the temporally varying signal.

DESCRIPTION OF THE PREFERRED EMBODIMENTS

Figure 1:
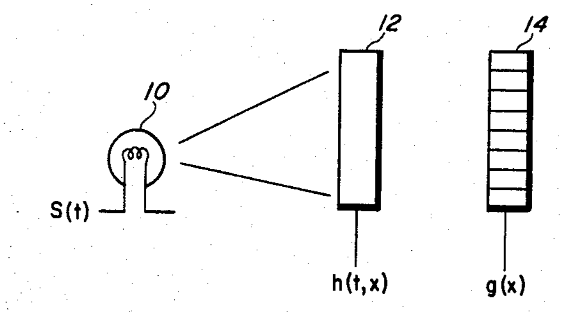
FIG. 1 is a pictorial representation of an optical processor.

Referring now to the drawings, wherein like reference numerals designate identical or corresponding parts throughtout the several views, and more particularly to FIG. 1 thereof, computation of the type required by the Fourier transformation of Eqn. (1) can be performed by optical processors. An optical processor of simple but quite general design, shown in schematic representation in FIG. 1, comprises a light source 10 the intensity of which is modulated by a temporally varying input signal S(t). The light source uniformly illuminates an acousto-optic (AO) cell 12 which by one of various mechanisms affects the light passing through it according to a function h(t,x), which in this general formulation is a function of both time and the distance along the acousto-optic cell 12. There are several types of interactions possible in the acousto-optic cell. For this initial discussion, let the interaction be a modulated photoelastic interaction which varies the phase of the light passing through the cell.

An optical detector array 14 is positioned to intercept the light passing through the acousto-optic cell 12 and is of a type which integrates the light intensity for a time T to produce the integrated intensity function g(x). It is assumed that each of the array elements can be individually read. For convenience, it is further assumed that there is a direct relationship between the positions x along the acousto-optic cell 12 and the detector array 14 so that the two positions are commonly labelled. The integrated intensity function is then given by $$g(x) = \int^{T} h(t,x)\, S(t)\, dt. \quad (2)$$

It can be seen that the optical processor of FIG. 1 acts to transform the function S(t) into the function g(x) according to the kernel h(t,x). The complication that the transformation, such as the Fourier transform of Eqn. (1), is integrated over infinite limits while the integration of Eqn. (2) is limited to a finite time T is not a major problem if the function S(t) is periodic or of negligible value for times longer than T.

The acousto-optic cell 12 having a generalized kernel h(t,x) is difficult to build and operate. A much simplified acousto-optic cell 12 relies on the fact that sound waves propagate through a crystal at a fixed and finite velocity v which is near 6 millimeters per microsecond for most crystals. If a signal h(t) is impressed on one end of an acousto-optic cell 12 by a piezo-electric transducer so as to launch a sound wave of velocity v and if the cell 10 is terminated at its other end so that no reflections occur, then the kernel of the cell assumes the simplified form $h(t,x)=h(t-x/v)$.

A form of kernel found particularly useful in implementing Fourier transforms is a chirp of linear FM in which the signal produced by the transducer is $$h(t)=\cos(\omega_o t+\alpha t^2/2) \quad (3).$$

The frequency $\omega_o$ is the carrier frequency of the acousto-optic cell and may be 1 GHz. However the frequency is swept at a chirp rate $\alpha$ to produce a linear FM signal having a constant envelope. Usually the frequency swept is a small fraction of the carrier frequency. The control circuitry providing the chirp signal may be a linearly swept FM generator.

One type of acousto-optic cell found particularly useful is a Bragg cell in which a wave launched by a transducer on one end of it will affect the refractive properties of the cell according to the local amplitude of the wave in the cell. A multi-wavelength waveform present on the Bragg cell will cause the cell to operate as a diffraction grating and to produce diffraction patterns of order n at an angle according to the Bragg equation $$\sin\theta_B=n\lambda/2a \quad (4)$$

where a is the period of the wave on the Bragg cell, $\lambda$ is the wavelength of the incident radiation and $\theta_B$ is the Bragg angle.

Figure 2:
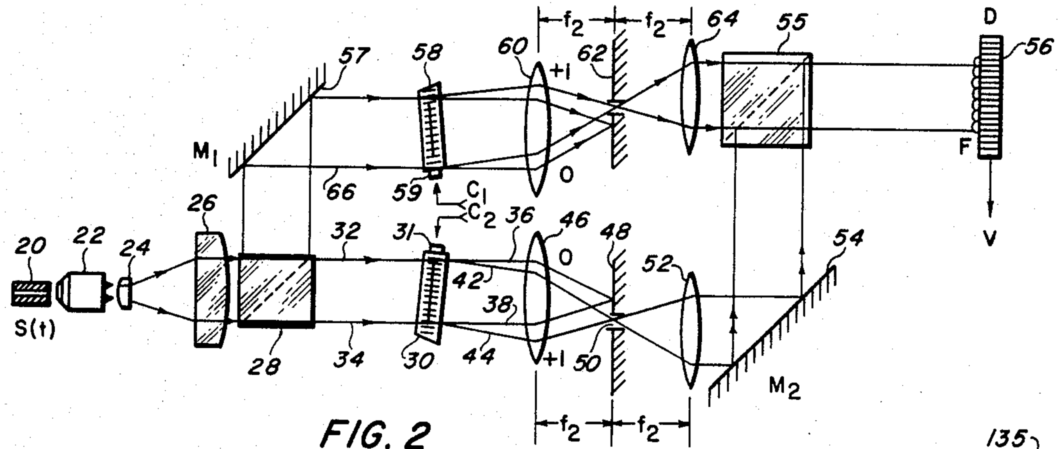
FIG. 2 PRIOR ART
FIG. 2 is a schematic representation of a prior art optical processor.

A Fourier transformer using the above concepts has been described by J. N. Lee et al. in Applied Physics Letters, volume 41, pages 131-133, 1982 which is herein incorporated by reference and is shown generally in FIG. 2. A laser 20 produces a beam of coherent light which is expanded but its collimation maintained by a microscope objective 22 and two cylindrical lenses 24 and 26. The relatively large collimated beam is then directed through a first beam splitter 28 which divides the beam into two equal beams. The lower beam is directed through a Bragg cell 30 onto which is applied a chirp signal through a piezo-electric transducer 31. In FIG. 2 is shown an incident upper ray 32 and lower ray 34 of the lower beam passing through the Bragg cell 30 as undiffracted upper and lower rays 36 and 38 respectively (i.e. of order 0) but also creating diffracted upper and lower rays 42 and 44. It will be assumed that the diffracted rays 42 and 44 are of order +1, i.e. n=1 in Eqn. (4). With the correct orientation of the Bragg cell 30, −1 order diffracted rays can alternately be used. For maximum efficiency of conversion of the incident rays 32 and 34 into +1 diffracted rays, the Bragg cell 30 is canted at the lowest order Bragg angle relative to the beam and the +1 diffracted rays 42 and 44 will be at twice the Bragg angle relative to the incident rays 32 and 34. The beams containing the diffracted and undiffracted rays, 42, 44, 36 and 38 are focussed by a lens 46 onto a mask 48 positioned such that the +1 diffracted rays 42 and 44 pass through a slit 50 in the mask 48 while the undiffracted rays 36 and 38 and all other orders of diffracted rays fall upon the mask 48 and are absorbed. The diffracted rays 42 and 44 are recollimated by another lens 52. This combination of lenses 46 and 52 and mask 48 is called a spatial filter and can be used to select one order of diffracted beam. The rays 42 and 44 are then reflected from a mirror 54 and then enter another beam splitter 55 which will act also as a beam combiner and will direct the beam toward an optical detector array 56.

The other beam resulting from the the first beam splitter 28 is treated in much the same way as the first beam, reflecting from a mirror 57, passing through a second Bragg cell 58 with a transducer 59 on one end, a lens 60, and through a mask 62 positioned to pass +1 diffracted rays, being recollimated by another lens 64 onto the beam splitter 55. However, it is required that the beam be oriented such that the ray 66 passing through the end of the Bragg cell 58 nearest the transducer 59 have originated from the same ray that produced the lower ray 34 passing through the end of the other Bragg cell 30 furthest from the transducer 31. It is further required that upon exiting the second beam splitter 55 these two rays be coincident so they can interfere with each other upon arriving at the detector array 56. The apparatus shown in FIG. 2 amounts to a Mach-Zehnder interferometer using the +1 order light diffracted from the Bragg cells 30 and 58. The two Bragg cells driven in opposite directions by a chirp signal are in the two arms of the Mach-Zehnder interferometer.

Because of the interference between the two beams, many of the lowest order terms of the beams cancel to leave mostly cross-terms between the beams. If the difference in separations of the locations in the Bragg cells 30 and 58 through which the rays from the respective transducer is denoted by a relative delay $\tau$ and if the element on the detector array 56 that detects both these rays is also denoted by $\tau$, then it can be shown that the element accumulates a charge after an integration time T of $$q(\tau) = k_1 \cdot \int^{T} I(t)\,dt + k_2 \cdot Re\left\{ \exp\left( -2i\omega_o\tau \cdot \int^{T} S(t)\exp(-i2\alpha\tau t)\,dt. \right.\right. \quad (5)$$

In Eqn. (5), I(t) is the laser intensity, $k_1$ and $k_2$ are proportionality constants, $\omega_o$ and $\tau$ are the carrier frequency and the chirp rate respectively of the chirp signal. The first term in Eqn. (5 ) is a signal dependent DC term, which must be eliminated to yield the second term which contains the Fourier transform of S(t) modulating the spatial carrier term $\exp(-i2\omega_o\tau)$.

The Fourier transformer of FIG. 2 has been successfully tested. However it suffers from numerous problems. It requires careful equilization of the pathlength, especially when the laser 20 is under pulse modulation, in order to ensure good fringe visibility. Furthermore because the optical paths are not common, the interferometer is also sensitive to phase perturbations that the environment introduces in one arm of the interferometer but not in the other. A further practical limitation is that two Bragg cells are required and good quality matched Bragg cells are expensive and difficult to obtain.

The performance of the Mach-Zehnder optical Fourier transformer can be greatly improved if only a single Bragg cell is used. This is accomplished as shown in pictorial representation in FIG. 3. This invention has been described by the inventor and others in two technical articles: J. N. Lee et al, "New acousto-optic devices for Fourier transformation," SPIE Proceedings, volume 341-Real Time Signal Processing V, pages 86–93 (1982) and S. Lin et al., "Simplified time-integrating acousto-optical processor for Fourier transformation," Optics Letters, volume 7, pages 448–450 (1982). Both these articles are incorporated herein by reference. A diode laser 70 and lenses 72 and 74 provide a collimated sheet beam 76 of coherent light. The sheet beam 76 is relatively uniform across its width and may be narrow in the other direction. The diode laser is modulated by the signal S(t) for which the Fourier transform is sought. The sheet beam 76 enters a first beam splitter 78 which divides the sheet beam 76 into a first beam 80 and into an equal second beam 82. The right-left orientation of the first beam 80 is reversed when it passes through a beam inverter 84 which may be a dove prism or a Schmidt-type prism. Thereafter the inverted first beam is reflected from a first beam mirror 86 which is oriented to reflect the inverted first beam into a reflected first beam 88 which is directed toward a Bragg cell 90 located somewhat above the lower plane occupied by the beam splitter 78, beam inverter 84 and first beam mirror 86.

The second beam 82 is reflected by a second beam mirror 92 located in the lower plane into a second reflected beam 94. The second beam mirror 92 is oriented so that the second reflected beam 94 is directed to the opposite face of the Bragg cell 90 from the face the first reflected beam 88 hits. Cylindrical lenses 96 and 98 can be placed on both sides of the Bragg cell 90 to improve focussing but it has been found that their use is unnecessary. The mirrors 86 and 92 are oriented so that both reflected beams 88 and 94 hit the Bragg cell 90 near the Bragg angle. From tracing rays in FIG. 3 it can be seen that rays passing in opposite directions through any point in the Bragg cell 90 originated from opposite sides of the collimated sheet beam 76. Stated alternately, a single ray in the collimated sheet beam 76 is split by the beam splitter 78 to form two rays which pass through opposite points of the Bragg cell 90 as measured from the midpoint of the Bragg cell 90.

The Bragg cell 90 is driven by a transducer 100 on one end that is controlled by a chirp signal cos $(\omega_0 t + \alpha t^2/2)$. As a result, the first reflected beam 88 produces an undiffracted first beam 104 and a +1 order first diffracted beam 102. Similarly the second reflected beam 94 produces an undiffracted first beam 106 and a +1 order second diffracted beam 108. Because of the symmetry imposed on the system, the first diffracted beam 102 overlays the second reflected beam 94. However the orientation of the mirrors 86 and 92 causes these two beams 94 and 102 to separate as the distance from the Bragg cell 90 increases. The same comment applies to the second diffracted beam 108 and the first reflected beam 88.

The undiffracted first beam 104 and undiffracted second beam 106 are absorbed by optical absorbers 110 and 112 respectively, both located in the lower plane. The diffracted first and second beam 102 and 108 are reflected by mirrors 114 and 116 respectively located in an upper plane and oriented so that the reflected diffracted beams 118 and 120 respectively are directed at a perpendicular angle to a second beam splitter 122 also located in the upper plane. As can be appreciated by an inspection of FIG. 3, the mirrors 86 and 92 must be spaced from the Bragg cell 96 by a sufficient distance so that the undiffracted beams 104 and 106 are completely separated from the diffracted beams 102 and 108 at the points that they intercept the mirrors 86 and 92. This requirement imposes a limitation on the miniaturization of the optical processor of FIG. 3.

The second reflected diffracted beam 120 is inverted by a second beam inverter 124 before it reaches the second beam splitter 122 which acts to coherently combine the first and second reflected diffracted beams 118 and 120 into first and second recombined beams 126 and 128. It is important to realize that the rays interfering to form rays in the recombined beams 126 and 128 have originated from the same part of the collimated sheet beam 76 but have passed through opposite ends of the Bragg cell 90. The rays in the first recombined beam fall on an integrating photo-detector array 130 containing a number of elements in the array corresponding to the desired resolution of the Fourier transformer. The photo-detector array 130 integrates for a time T after which the charge in the individual elements are read and digitized for further processing by a data controller 132 such as a computer.

The data read from the photo-detector array 130 is interpreted just as J. N. Lee et al. did, i.e. the envelope of the spatial distribution over the detector array 130 is equivalent to the frequency distribution of the Fourier transform S'(f) of the input signal S(t). The frequency f is equal to the quantity $2/\tau$ where $\tau$ is the time delay between the two points of the Bragg cell through which pass the two rays that recombine into the final ray hitting the element of the detector array 130.

The usefulness of this invention is improved if the DC background, the first term of Eqn.(5), and other noise are subtracted out. This can be accomplished by one of three methods. An electro-optical phase modulator 133 can be introduced into one of the arms of the interferometer. The signal S(t) is repeated for a second integration time T. However for the second run, the phase modulator introduces a phase change of 180° in one of the beams while the other beam is left unperturbed. The individual elements of the detector array are compared between runs and any differences arise from the second term of Eqn.(5). The same sort of phase modulation can be introduced by attaching one of the mirrors, say mirror 116, to a piezo-electric driver 134 which increases the pathlength of one of the arms, namely the beam reflected from that mirror 116 by half a wavelength of the radiation of the laser 70. The background subtraction can be done on a single pass of the signal S(t) by instrumenting the second recombined beam 128 with a separate detector array 131 and making an element-to-element comparison between the two detector arrays via a subtractor 135.

Figure 3:
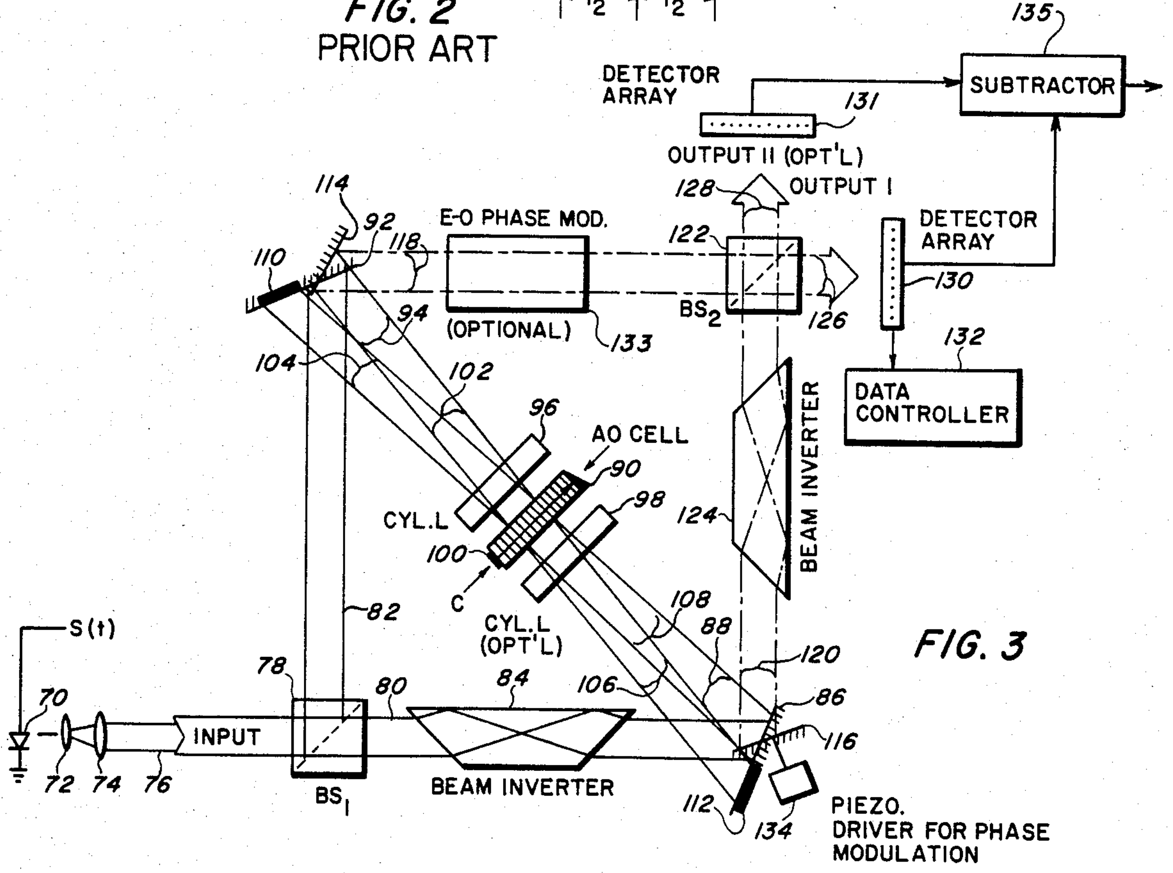
FIG. 3 is a schematic cross-section of an embodiment of the invention using two beam splitters.
Figure 4:
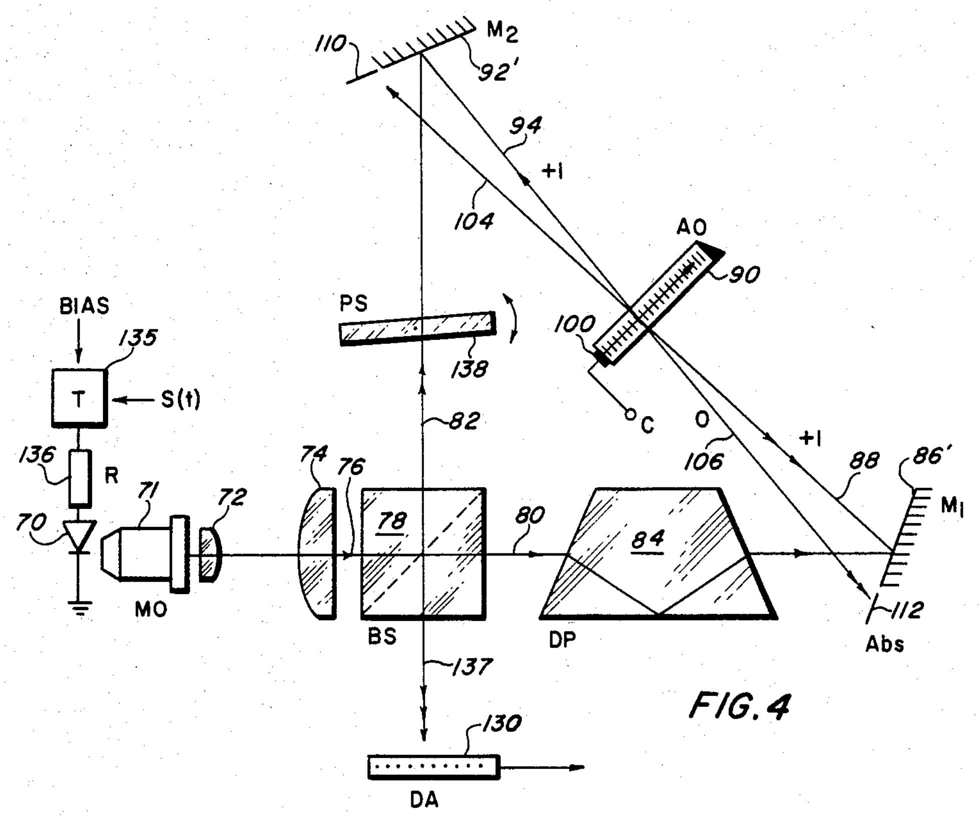
FIG. 4 is a schematic cross-section of an embodiment of the invention using one beam splitter and unpolarized light.

A second embodiment of the invention, shown in pictorial representation in FIG. 4, is similar to that of FIG. 3 except that two mirrors and a beam splitter are eliminated, thereby reducing the size of the interferometer. Details of the laser control circuitry are also shown. The DC bias to the laser 70 and the signal S(t) are combined in a bias tee 135 which is separated from the diode laser 70 by a load resistor 136. Mirrors 86′ and 92′ have been extended to pass through both the upper and lower planes. The +1 order diffracted first beam, shown as beam 102 in FIG. 3, follows the path of the second reflected beam 94 shown in FIG. 4 but is diverging from it out of the plane as the diffracted first beam 94 leaves the Bragg cell 90. The diffracted first beam is reflected from the extended mirror 92′ and then follows the path of the second beam 82 but in the upper plane until it enters the first beam splitter 78 which must be tall enough to pass through both planes. Likewise the second diffracted beam shown as 108 in FIG. 3 is reflected from the extended mirror 86′ in FIG. 4 and follows the path of the first beam 80 through the inverter 84 into the first beam splitter 78, all in the upper plane.

The beams resultant from the first and second diffracted beams are recombined in the first beam splitter 78 into a recombined beam 137 that is spatially detected by a photodetector array 130. Background subtraction can be accomplished by placing a glass slide 138 in a vertical position where it passes through the upper plane but not the lower plane and then rotating it between successive runs of S(t) to introduce a 180° phase shift in that one diffracted beam. Then the data on the individual elements of the detector array 130 are compared between successive runs.

Figure 5:
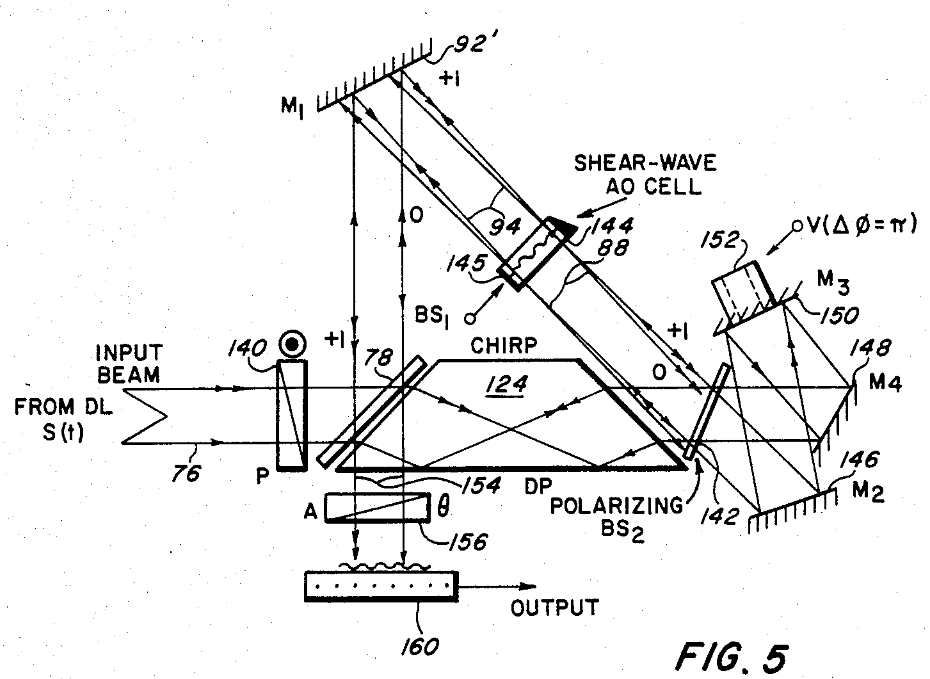
FIG. 5 is a schematic cross-section of an embodiment of the invention using polarization discrimination.

A third embodiment shown in pictorial representation in FIG. 5 allows for a more compact design and increases discrimination against background by the use of polarized light. A polarizer 140 is set in the collimated sheet beam 76 originating from the diode laser not shown. The polarizer 140 is oriented to pass only vertically polarized light, i.e. out of the plane shown in FIG. 5. A beam splitter 78, splits the vertically polarized beam into two beams. One of these beams is inverted in the beam inverter 124 and is then reflected from a polarizing beam splitter 142 to a shear-wave Bragg cell 144. The polarizing beam splitter 142 is oriented so as to reflect vertically polarized light. The other beam is reflected from the extended mirror 92′ into the other side of the shear-wave Bragg cell 144. The shear-wave Bragg cell 144 supports shear waves which are launched by a transversely mounted transducer 145. The chirp signal drives the transducer. When the electric field of a beam incident on a Bragg cell is perpendicular to the direction of the propagation of a shear wave, the resultant diffracted beam has a polarization shifted 90° from that of the incident beam. Thus one of the diffracted beams upon hitting the polarizing beam splitter 142 is passed through and hits a series of oriented mirrors 146, 148, and 150 before again passing the polarizing beam splitter 142. From that point it enters the beam inverter 124 before being partially reflected by the beam splitter 78. One of the mirrors 150 is connected to a piezo-electric driver 152 which provides a 180° phase shift between successive runs for background subtraction. The other diffracted beam is simply reflected from the extended mirror 92′ and then is partially transmitted through the beam splitter 78. The diffracted beams are thus recombined by the beam splitter 78 into a final beam 154 which then passes through a polarizer 156 set to pass only horizontally polarized light so that any undiffracted light is blocked. The final beam then falls on an integrating photo-detector array 160, the charge on the elements of which provide the Fourier transform.

The utility of the invention has been experimentally determined using the embodiment of FIG. 4 including a background subtraction of successive signal runs with the glass slide 138 introducing phase shift of 180° in alternate runs.

Figure 6:
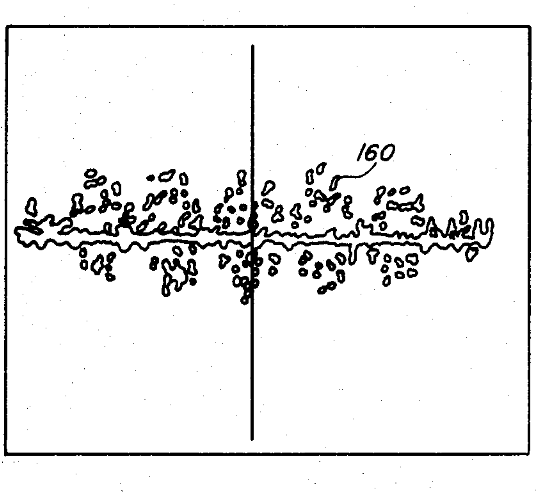
FIG. 6 is an oscilloscope trace of the output of the embodiment of FIG. 4. The horizontal axis is frequency and the vertical axis is the Fourier transform of the input signal, a series of two pulses. The Fourier transform is modulating a spatial carrier.

In one test, the diode laser is biased at its current threshold and two successive square voltage pulses modulated the laser's intensity. Both the chirp length and the integration time are 40 ms. Represented in FIG. 6 is an oscilloscope trace of the differenced output of the detector array 130. The envelope of the oscilloscope trace is the Fourier transform. Within this envelope is an oscillating spatial carrier $\exp(-2i\omega_o\tau)$. The envelope of the oscilloscope trace 160 generally follows the theoretically predicted function (sin Nx)/(N sin x) where N is the number of pulses in the signal S(t) and x is the displacement along the detector array which is related to the frequency components of the impressed square pulse.

Figure 7:
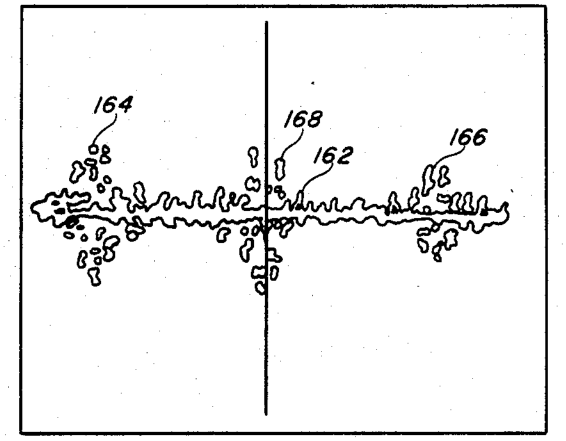
FIG. 7 is similar to FIG. 6 but with a sinusoidal input signal.

In another test, the diode laser is biased at 125% of the threshold current and a sinusoidal signal at 200 Hz is further impressed on the laser. Represented in FIG. 7 is an oscilloscope trace 162 of the output of the detector array 130. The two peaks 164 and 166 correspond to the 200 Hz impressed signal. The central peak 168 is spurious and is caused by the above-threshold biasing of the diode laser.

It is to be appreciated that other optical technologies such as fiber optics can be beneficially used with this invention. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A real-time optical Fourier transformer of a temporally varying signal, comprising:
- an acousto-optical cell;
- a control circuit for impressing a chirp signal upon the acousto-optical cell;
- a light source for providing a beam of coherent light;
- means for intensity modulating said coherent beam by the temporally varying signal;
- a beam splitter for dividing said beam of coherent light into two incident beams;
- optical means for directing said two incident beams onto opposing sides of the acousto-optical cell with the corresponding rays in said two incident beams passing through opposing ends of said acousto-optical cell, whereby both beams are at least partially diffracted into diffracted beams, the order of both diffracted beams being the same;
- optical means for combining both diffracted beams with the corresponding rays of both diffracted beams becoming coincident; and
- a time-integrating detector for measuring the integrated intensity of at least one point across the combined beam, whereby the spatial distribution of integrated intensities is related to the Fourier spectrum of said temporally varying signal.

2. A real-time optical Fourier transformer, as recited in claim 1, wherein said acousto-optical cell is a Bragg cell.

3. A real-time optical Fourier transformer, as recited in claim 1, wherein said time-integrating detector is a photodetector array and further comprising means for reading the individual elements of the array.

4. A real-time optical Fourier transformer, as recited in claim 1, wherein the combining optical means comprise a second beam splitter and further comprising:

a second time-integrating detector for measuring the integrated intensity at at least one point across a second combined beam exiting said second beam splitter; and comparison means for differencing the intensities at corresponding points of said two combined beams.

5. A real-time optical Fourier transformer, as recited in claim 1, further comprising:

phase modulating means for introducing a phase shift in one of said incident and diffracted beams; and a data controller for comparing the intensities at a point across the combined beam between different runs of the temporally varying signal.

6. A real-time optical Fourier transformer of a signal to be analyzed, comprising:

a laser for providing a beam of coherent light;

means for intensity modulating the output of said laser by said signal to be analyzed;

means for generating a chirp signal;

a Bragg cell that is driven by said chirp signal;

a first beam splitter for dividing the laser beam into two incident beams, each propagating along a different path;

a first beam inverter disposed in the path of one of said incident beams;

a set of mirrors for reflecting said two incident beams onto opposing sides of said Bragg cell with the corresponding rays of the two incident beams striking opposite ends of said Bragg cell, whereby both said incident beams produce diffracted beams;

a second beam splitter;

a set of mirrors for reflecting said two diffracted beams to the second beam splitter which then coherently combines said diffracted beams into two final beams;

a second beam inverter disposed in the path of the diffracted beam produced by the other of said incident beams;

a first photo-detector array of detecting elements disposed in the path of one of said two final beams which integrates the light intensity of at least one portion of said one final beam for an integration time, whereby the distribution of integrated light intensity of said detecting elements is related to the Fourier transform of said signal to be analyzed.

7. A real-time optical Fourier transformer of a signal to be analyzed, as recited in claim 6, further comprising:

a second photo-detector array disposed on the path of the other of the final beams; and a data controller for comparing the integrated light intensity measured by the corresponding individual elements of the first and second photo-detector arrays, whereby differences in intensities are related to the Fourier transform of the signal to be analyzed with DC background subtracted out.

8. A real-time optical Fourier transformer of a signal to be analyzed, as recited in claim 6, further comprising:

a phase modulator in one of the paths of an incident beam and the diffracted beam produced by it that changes the phase length of said path by substantially 180° between different runs of the signal to be analyzed; and a data controller for comparing the integrated light intensities measured by the elements of said first photo-detector array between said different runs, whereby differences in intensities are related to the Fourier transform of the signal to be analyzed with DC background subtracted out.

9. A real-time optical Fourier transformer of a signal to be analyzed, comprising:

a laser for providing a beam of coherent light;

means for intensity modulating the output of said laser by said signal to be analyzed;

means for generating a chirp signal;

a Bragg cell that is driven by said chirp signal;

a beam splitter for dividing the laser beam into two incident beams, each propagating along a different path;

a beam inverter disposed on the path of one of said incident beams;

a set of mirrors for reflecting said two incident beams onto opposing sides of said Bragg cell with the corresponding rays of the two incident beams striking opposite ends of said Bragg cell, whereby both said incident beams produce diffracted beams which are reflected along different paths via said set of mirrors to said beam splitter, wherein said diffracted beams are combined into a final beam propagating along a path;

a second beam inverter disposed in the path of the diffracted beam produced by the other of said incident beams;

a first photo-detector array of detecting elements disposed in the path of said final beam which integrates the light intensity of at least one portion of said final beam for an integration time, whereby the distribution of integrated light intensity of said detecting elements is related to the Fourier transform of said signal to be analyzed.

10. A real-time optical Fourier transformer of a signal to be analyzed, as recited in claim 9, further comprising:

means for introducing a phase shift of substantially 180° in one of the incident beams and diffracted beams between different runs of the signal to be analyzed; and a data controller for differencing the intensities measured by said first photo-detector array between said different runs.

11. A real-time optical Fourier transformer of a signal to be analyzed as recited in claim 9, wherein the chirp signal on the Bragg cell produces a shear wave, and further comprising a polarizer set in the path of the coherent beam from the laser.

12. A real-time optical Fourier transformer of a signal to be analyzed, as recited in claim 11, further comprising:

means for modulating phase shift in one of the incident and diffracted beams between different runs of the signal to be analyzed; and a data controller for differencing the intensities read by said first photo-detector array between said different runs.

13. A method of Fourier analyzing a temporally varying signal, comprising the steps of:

modulating a beam of coherent light with the temporally varying signal;

splitting the modulated beam into two incident beams;

directing said incident beams onto opposing sides of an acousto-optical cell with the corresponding rays thereof passing through opposite ends of said acousto-optical cell;

impressing a chirp signal upon an end of said acousto-optical cell, whereby each of said two incident beams produces a diffracted beam of the same order in said acousto-optical cell;

combining said two diffracted beams with the corresponding rays thereof being coincident into at least one final beam; and integrating over time the intensity of at least one portion of said at least one final beam, whereby said integrated intensity is related to the fourier transform of the temporally varying signal.

* * * * *